UNITED STATES PATENT OFFICE.

PAUL FLEMMING, OF HAMBURG, GERMANY.

HALOGENPHENOLALKALI SALTS AND PROCESS FOR THE MANUFACTURE OF SAME.

1,036,087.      Specification of Letters Patent.      Patented Aug. 20, 1912.

No Drawing.      Application filed October 12, 1911. Serial No. 654,273.

*To all whom it may concern:*

Be it known that I, PAUL FLEMMING, chemist, citizen of Germany, subject of the German Emperor, residing at Moorfurtweg 13–15, in the free town of Hamburg, in the State of Hamburg and Empire of Germany, have invented new and useful Improvements in Halogenphenolalkali Salts and Processes for the Manufacture of Same, of which the following is a specification.

Crystallized double compounds of phenol-Alkali salts with phenol are known, and are produced by letting phenol, if desired in organic solvent media, act on alkalis, or salts with alkaline reaction. I have found that it is possible in a similar manner to produce complex halogenphenolalkali salts. This result was by no means to be foreseen as, on account of the presence of the halogen it seemed probable that the reaction would take quite a different course. As a matter of fact the complex halogen phenolalkali salts produced by such methods are not compounded analogously to the corresponding complex phenolalkali salts. On the contrary the new substances differ considerably both in chemical composition and also in part in physical qualities, especially solubility in water, from the compounds of the non-substituted phenols obtained by corresponding methods. The new compounds are obtained by the method of treating halogen-phenols or their homologues separately or in an organic solvent medium with alkalis, or salts with an alkaline reaction.

The new process is illustrated in a series of examples as follows:

Example 1: 42 parts p-chloro-m-cresol are dissolved in approximately 40 parts of benzene, 5.6 parts of potassium hydrate are added and heated until dissolved. On cooling a complex compound crystallizes out.

Example 2: 38.4 parts chlorophenol, 30 parts benzene, 5.6 parts potassium hydrate, are dissolved under heat and give on cooling fine crystals which are drawn off and cleansed by recrystallizing.

Example 3: 28 parts chlorocresol, 5.6 parts potassium hydrate are melted together and if desired are warmed with the addition of an organic solvent medium. A new double salt results.

Example 4: 42 parts chlorocresol, 8 parts sodium hydroxid are warmed with toluene. A complex compound is formed.

The new compounds obtained in this manner possess the general composition $x\text{ROAlk}.y\text{ROH}$, wherein $x$ and $y$ indicate the number of molecules of halogenphenolalkali or free halogenphenol and R the halogenphenol compound used. With potassium salts especially, the compounds shown have the composition $\text{ROK}.2\text{ROH}$ or $\text{ROK}.\text{ROH}$. With sodium salts on the other hand they have the composition $2\text{RONa}.\text{ROH}$.

The new substances are remarkable for their great power of disinfection and considerably surpass in effectiveness all hitherto known preparations of organic origin soluble in water, even the preparations of halogencresol soluble in water produced by other methods, especially of p-chloro-m-cresol.

The new compounds are remarkable when contrasted with the known complex salts of the phenols, further for their extraordinary readiness to dissolve in water, their good keeping qualities, and also the fact that, especially when in solution, they are almost odorless. The salts have an alkaline reaction and when heated split off the chlorophenol which they contain.

Having now described my invention what I claim and desire to secure by Letters Patent of the United States is:

1. A process for the manufacture of halogenphenolalkali salts and their homologues, which consists in treating a member of the homologous series of which a halogenphenol is the lowest member with a compound of alkali having an alkaline reaction, and isolating the complex salt which crystallizes therefrom.

2. A process for the manufacture of halogenphenolalkali salts and their homologues which consists in treating a member of the homologous series of which a halogenphenol is the lowest member, in an organic solvent medium with an alkali and isolating the complex salt which crystallizes therefrom.

3. Halogenphenolalkali salts of the general composition $x\text{ROAlk}.y\text{ROH}$ where $x$ and $y$ indicate the number of the molecules, R a member of the homologous series of which a halogenphenol is the lowest member thereof and Alk. an alkali radical, said complex halogenphenolalkali salts crystallizing well, being easily soluble in water or alcohol, almost odorless, especially in solution, and having great power of disinfection and good keeping qualities.

4. Complex p-chloro-m-cresol sodium of the composition

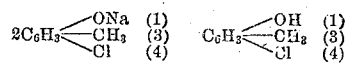

the new compound being a crystallic, non-hygroscopic body with good keeping qualities, easily soluble in water and alcohol but difficultly soluble in hydrocarbons, being almost odorless, especially in solution and having great power of disinfection.

In testimony whereof I have hereunto set my hand in presence of two subscribing witnesses.

PAUL FLEMMING.

Witnesses:
ERNEST H. L. MUMMENHOFF,
IDA CHRIST HAFERMANN.